N. E. WAHLBERG.
CONTROL MECHANISM FOR MOTOR VEHICLES.
APPLICATION FILED MAR. 3, 1914.
1,126,925.
Patented Feb. 2, 1915.
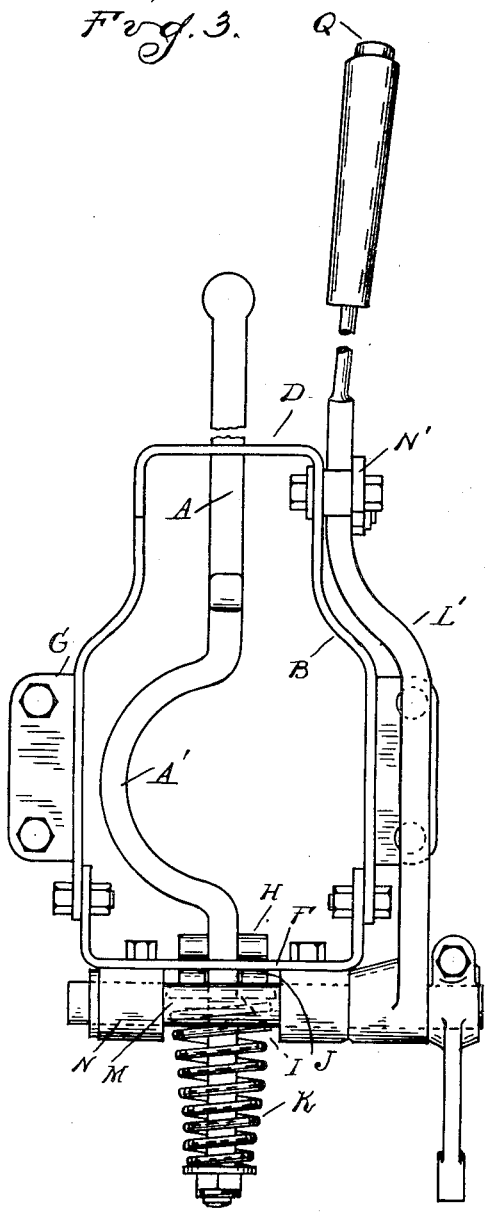
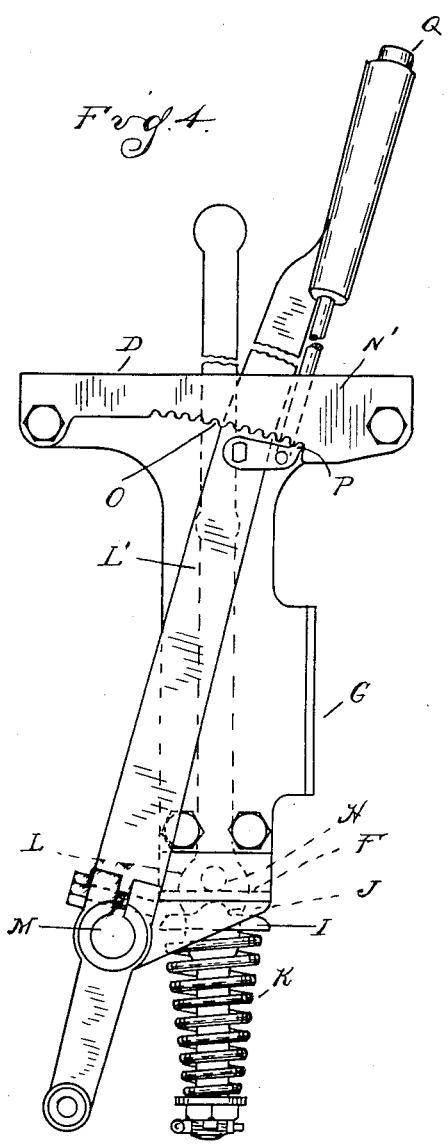
WITNESSES:
INVENTOR
Nils Erik Wahlberg
BY
ATTORNEYS

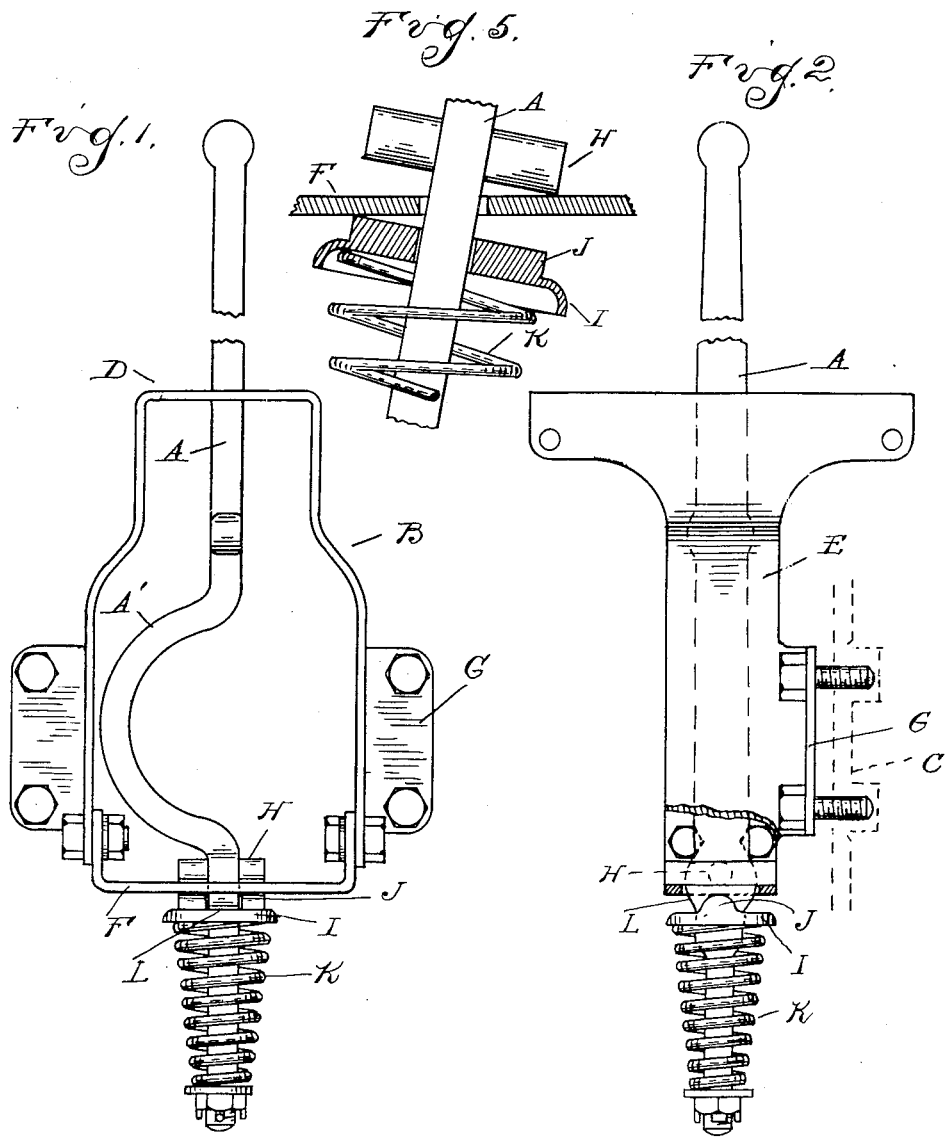

UNITED STATES PATENT OFFICE.

NILS ERIK WAHLBERG, OF PONTIAC, MICHIGAN, ASSIGNOR TO OAKLAND MOTOR CAR COMPANY, OF PONTIAC, MICHIGAN, A CORPORATION OF MICHIGAN.

CONTROL MECHANISM FOR MOTOR-VEHICLES.

1,126,925.     Specification of Letters Patent.     Patented Feb. 2, 1915.

Application filed March 3, 1914. Serial No. 822,178.

*To all whom it may concern:*

Be it known that I, NILS ERIK WAHLBERG, a citizen of the United States of America, residing at Pontiac, in the county of Oakland and State of Michigan, have invented certain new and useful Improvements in Control Mechanism for Motor-Vehicles, of which the following is a specification, reference being had therein to the accompanying drawings.

The invention relates to motor vehicle control mechanisms, and has for its object the obtaining of a simple and effective construction having advantageous features, as hereinafter set forth.

In the drawings: Figure 1 is a front elevation of the control; Fig. 2 is a side elevation thereof; Figs. 3 and 4 are views similar to Figs. 1 and 2 showing a modified construction; and Fig. 5 is a diagrammatic cross section of a portion of Fig. 1 illustrating the operation.

My improved construction is more particularly designed for use in what is known as center control, in which the controlling lever is at the center instead of the side of the machine. The construction is, however, equally applicable to the side control type, but as illustrated the center control is shown.

In detail, A is the control lever, which is preferably located at the end of the transmission gearing (not shown).

B is a frame to which the lever A is attached, and which is preferably bolted to the end of the transmission gear housing, as indicated by dotted lines at C. This frame B preferably forms both the fulcrum for the lever and the guide therefor, or what is commonly known as the H-plate. The latter portion is preferably at the top D, and from the opposite sides thereof are depending portions E, which at their lower ends are connected by a separate cross bar F. Ears G are also preferably bent from the side portions to form the means of attachment to the gear housing.

It is one of the objects of the invention to fulcrum the lever so as to permit of universal pivotal movement without the use of sliding parts requiring lubrication. This is accomplished by securing to the lever a cross pin H, which lies in rolling contact against the upper face of the bar F. Below said bar is a plate I which has rounded lugs J opposite the pin H and lying in rolling contact with the under face of the bar F. The plate I is sleeved upon the shank of the lever A, and is held in contact with the bar F by the tension of a spring K also sleeved upon the lever. The lever itself is flattened in a plane perpendicular to the axes of the pin H and lugs J and engages a slot of corresponding width in the bar F. Thus, when the lever is rocked, the surface of the pin H will roll upon the upper surface of the bar F, while the surface of lugs J which act as rolls will roll on the lower surface of said bar, while the spring K will yield to provide the necessary increased space between said rolling members, required by their movement in opposite directions.

To hold the lever in its normal position and to prevent accidental displacement, the slot in the bar F, through which it passes, is substantially of the same size as the cross section of the lever. The lever, however, in moving will assume an angular position, and to permit of this the portion which engages the slot is rounded at L, being suitably curved to at all times provide clearance. The correct mathematical curve for this would be a cycloid, but in practice a circular arc drawn from a center intermediate the axes of the pin H and lugs J will serve the purpose.

In the manipulation of the lever, it is rocked laterally as well as longitudinally to transfer its engagement to the opposite sides of the H-plate. This rocking movement is also permitted by the construction just described, the effect being to tilt the pin H and lugs J, so that only the opposite members of the pair are in rolling contact, as shown in an exaggerated way in Fig. 5.

With the construction as described in use, the lever may be rocked either longitudinally or laterally, and in such movement rolls upon its fulcrum instead of sliding. This avoids the necessity of using a lubricant, which would be difficult to maintain in the exposed position of the lever. A further function performed is the placing of a slight tension on the lever, acting to return it to its neutral position. This is due to the compression of the spring K whenever the lever is rocked either longitudinally or laterally, and consequently the lever when in its neutral position or in the cross slot of the H-plate, will be yieldably held in this position by said spring. Furthermore, when released in any other position there is a slight tendency for it to return to the neutral, but this is inefficient to move the lever without the assistance of the operator.

In Figs. 3 and 4, the control mechanism just described is combined with an emergency brake lever construction, which comprises a lever L′ secured to a rock shaft M. The rock shaft is journaled in bearings N secured to the cross bar F, and the lever is guided by a guide plate N′ secured to one side of the H-plate. This same guide plate N′ is preferably notched at O for the engagement of a locking dog P controlled by a push button Q or other releasing device upon the handle of the lever.

The frame B is preferably so located as to surround the transmission shaft (not shown) of the vehicle transmission. To provide clearance for this shaft the lever A is laterally offset at A′, as shown.

What I claim as my invention is:

1. In a control mechanism, the combination with a lever of a slotted bearing through which said lever passes, rolling faces non-rotatively and relatively movably attached to said lever upon opposite sides of said bearing, and resilient means for pressing said rolling faces toward each other and in contact with the opposite faces of said bearing.

2. The combination with a slotted member, of a lever passing through said slot, lateral projections from said lever on opposite sides of said slotted member, having curved faces in rolling contact with the opposite faces of said member, one of said projections being movable longitudinally of said lever, and resilient means for pressing said movable member in contact with the coöperating surface of said slotted member.

3. The combination with a slotted member, of a lever passing through said slot, a laterally projecting roll rigidly attached to said lever on one side of said slotted member, a roll non-rotatively secured to said lever upon the opposite side of said slotted member, having its axis parallel to the axis of the first-mentioned roll, and resilient means for pressing the last-mentioned roll toward the former to maintain both rolls in rolling contact with the opposite faces of said slotted member.

4. The combination with a slotted member, of a lever passing therethrough, a pair of rolls non-rotatively secured to said lever upon opposite sides of said slotted member and relatively movable on said lever toward and from each other, and a resilient member for pressing said rolls toward each other to maintain the same in rolling contact with the opposite faces of said slotted member.

5. The combination with a slotted member, of a lever passing through said slot, rounded projections extending from said lever upon opposite sides of said slotted member, having corresponding rolling contact with the opposite faces of said slotted member, said lateral projections being relatively movable on said lever toward and from each other, and resilient means for pressing said projections toward each other.

6. The combination with a slotted member, of a lever passing therethrough, and lateral projections extending from said lever upon opposite sides of said slotted member, yieldably pressed toward each other in rolling contact with the opposite faces of said slotted member, the portion of said lever passing through the slot being fashioned to fit the same in all positions of angular adjustment.

7. The combination with a slotted member, of a lever passing therethrough, a rounded lateral projection extending from said lever upon one side of said slotted member, a member sleeved upon said lever having a corresponding rounded projection upon the opposite side of said slotted member, and a spring upon said lever for forcing said sleeved member and rounded portion thereof toward the rounded projection on the opposite side of said slotted member to maintain both of said projections in rolling contact with the opposite faces of said slotted member.

8. In a control mechanism, the combination with a lever, of a slotted member through which said lever passes and with which it has a universal rockable movement, and resilient means mounted on said lever for pressing the same toward the neutral position of adjustment.

9. In a control mechanism, the combination with a lever, of a slotted member through which said lever passes, rounded projections on opposite sides of said lever and upon opposite sides of said slotted member, the latter being movable toward each other, and resilient means carried by said lever for pressing said relatively movable members toward each other to yieldably hold said lever in neutral position.

10. In a control mechanism, a lever, a frame having a slotted guide portion through which said lever passes and a parallel slotted portion in which said lever is fulcrumed, rounded lugs upon said lever on opposite sides of said slotted fulcrum portion and movable toward and from each other, and a spring sleeved upon said lever for yieldably forcing the movable rounded lug toward the opposite lug to maintain both in rolling contact with the faces of said slotted fulcrum portion.

11. A control mechanism, comprising a lever, a slotted member through which said lever passes, rounded lugs projecting oppositely from said lever on one side of said slotted member, corresponding rounded lugs sleeved upon said lever upon the opposite sides of said slotted member, and a spring sleeved upon the shank of said lever engaging said sleeve member, for maintaining said rounded lugs in rolling contact with the opposite faces of said slotted member.

In testimony whereof I affix my signature in presence of two witnesses.

NILS ERIK WAHLBERG.

Witnesses:
WM. J. BELKNAP,
JAMES P. BARRY.

Copies of this patent may be obtained for five cents each, by addressing the "Commissioner of Patents, Washington, D. C."